(12) United States Patent
Gummadi et al.

(10) Patent No.: US 7,136,436 B2
(45) Date of Patent: Nov. 14, 2006

(54) BOUNDARY DETECTION USING MULTIPLE CORRELATIONS

(75) Inventors: Srikanth Gummadi, Santa Rosa, CA (US); Richard Williams, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 728 days.

(21) Appl. No.: 09/996,197

(22) Filed: Nov. 28, 2001

(65) Prior Publication Data

US 2003/0099312 A1    May 29, 2003

(51) Int. Cl.
*H03D 1/00* (2006.01)
*H04L 27/06* (2006.01)

(52) U.S. Cl. .......................... 375/342; 375/343

(58) Field of Classification Search ................ 375/130, 375/142, 150, 343, 342; 708/422, 426
See application file for complete search history.

(56) References Cited

U.S. PATENT DOCUMENTS

| | | | |
|---|---|---|---|
| 5,621,773 A * | 4/1997 | Varma et al. ................ | 375/368 |
| 5,673,296 A * | 9/1997 | Ohgane ....................... | 375/368 |
| 5,960,048 A | 9/1999 | Haartsen et al. | |
| 6,279,022 B1 * | 8/2001 | Miao et al. .................. | 708/404 |
| 6,594,327 B1 * | 7/2003 | Radi ............................ | 375/356 |
| 6,657,954 B1 * | 12/2003 | Bird et al. ................... | 370/229 |
| 6,741,667 B1 * | 5/2004 | Suda ............................ | 375/354 |
| 2001/0024454 A1 * | 9/2001 | Hasegawa et al. ........... | 370/503 |

FOREIGN PATENT DOCUMENTS

EP    0 782 295 A    7/1997

\* cited by examiner

*Primary Examiner*—Jean B. Corrielus
(74) *Attorney, Agent, or Firm*—Steven A. Shaw; W. James Brady; Frederick J. Telecky, Jr.

(57) ABSTRACT

Detecting a boundary between training sequences in a transmission is an important operation. In many communications systems, there are no special boundaries or markers to denote the end of one sequence and the beginning of another. Correlation has been a commonly used technique to detect sequences and a fall in the correlation can be used to indicate such boundaries, but classical correlation can be slow and a significant portion of the new sequence is received prior to the boundary being detected. A method and apparatus is presented that allows rapid detection of the boundary and only a small amount of the new sequence needs to be received prior to the detection of the boundary. Additionally, the method and apparatus can be used to detect the presence of a transmission on the communications medium.

3 Claims, 5 Drawing Sheets

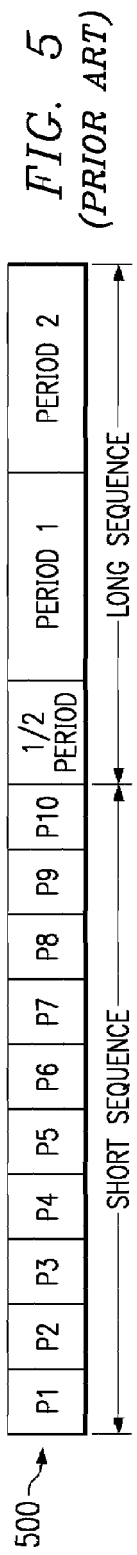
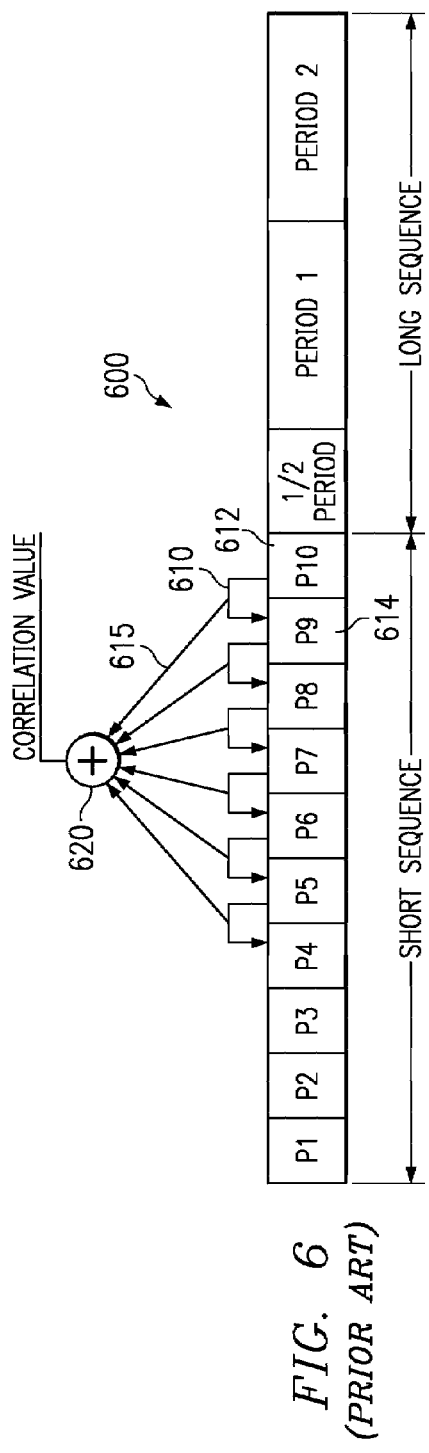
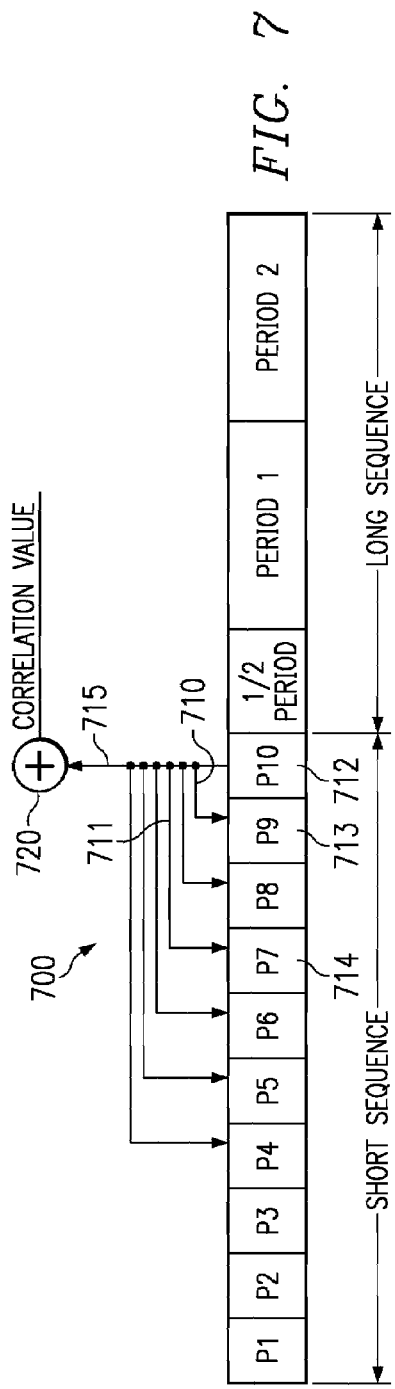
FIG. 5 (PRIOR ART)
FIG. 6 (PRIOR ART)
FIG. 7

BOUNDARY DETECTION USING MULTIPLE CORRELATIONS

FIELD OF THE INVENTION

This invention relates generally to digital communications, in particular to detecting the occurrence of a boundary between sequences in a digital sample stream through correlating a received sample value with a plurality of previously received sample values from the same digital sample stream.

BACKGROUND OF THE INVENTION

In many modern wireless communications systems, information is organized into data units. When transmitted, the data units may be partitioned into transmission packets, with the number of packets depending on the size of the data units. The data units contain the information being transmitted along with control information. The control information includes destination information, network identifier, data rate, information length, and the like. For example, in an IEEE 802.11a wireless network, each data unit begins with a 16 micro-second field containing a short and a long sequence field, with each field being eight micro-seconds in length. The short and the long descriptors refer to the periodicity of the sequences. The 16 micro-second field contains ten periods of the short sequence and two and a half periods of the long sequence. Following the 16 micro-second field is another field containing information such as the bit-rate and the encoding of the data that is to follow.

The short sequence is used mainly to allow the wireless stations to detect the presence of a transmitted packet (which in turn, contains at least a portion of the data unit) on the shared communications medium and to adjust its receiver signal gain to bring the received signal to a level acceptable for processing purposes. The purpose of the long sequence is to allow the intended recipient of the data unit to make adjustments to its receiver hardware to maximize the probability of accurately receiving the data unit. The adjustments include configuring the receiver's adaptive channel equalizer and digital filters to current communications channel conditions.

In many communications systems, training sequences are typically transmitted concatenated together, without any indicator (or boundary) of when one sequence ends and when another begins. For sequences that are used to adjust receiver hardware and software, it is vital that the particular sequences be recognized as rapidly as possible.

A proposed solution involves correlating the received signal with a locally stored copy of the desired signal or, in the case of when the desired signal is periodic and the transmission contains several periods of the desired signal, correlated with previously received signals. Whenever the correlation results in a correlation value that exceeds a predetermined threshold, the desired signal is deemed to have been received and when the correlation value drops off, a boundary between different sequences is detected. Classically, correlating two signals involves multiplying one by the complex conjugate of the other. When limited precision is used, this is equivalent to comparing individual data values from each sequence and if the data values match, a correlation value is incremented. However, comparing pairs of data values from the received signal requires that a significant percentage of the different signal be received before the presence of the change can be detected.

A need has therefore arisen for a method to provide rapid determination of boundary between different sequences in a digital data stream and that can also be used to detect the presence of a transmitted packet in a formerly idle communications medium.

SUMMARY OF THE INVENTION

A preferred embodiment of the present invention provides a way to rapidly detect boundaries between training sequences in a digital sample stream using multiple correlations of a single digital sample value in the digital sample stream against multiple other digital sample values from the same digital sample stream. When a training preamble is transmitted, often, different portions of the preamble are transmitted in a concatenated form with no boundaries or markers between the different portions. By exploiting differences between the different portions, such as periodicity, a preferred embodiment of the present invention can rapidly detect the boundaries between the different portions.

In one aspect, the present invention provides a method for detecting the presence of a boundary between different sequences in a digital sample stream involving the reception of the stream of digital sample values, performing multiple correlations between a digital sample value with a group of previously received digital sample values, calculating a correlation value based on the results of the individual correlations, comparing the correlation against a threshold and determining if a boundary is present based on the result of the comparison.

The present invention provides a number of advantages. For example, use of a preferred embodiment of the present invention can detect the presence of sequence boundary in a digital sample stream more rapidly than standard pattern detection techniques.

Also, since the present invention has the same false boundary detection/non-detection probabilities as the standard boundary detection techniques, use of the present invention does not negatively impact the accuracy performance of the boundary detection.

BRIEF DESCRIPTION OF THE DRAWINGS

The above features of the present invention will be more clearly understood from consideration of the following descriptions in connection with accompanying drawings in which:

FIG. 5 displays a diagram illustrating a concatenation of a short sequence and a long sequence according to the IEEE 802.11a technical standard;

FIG. 6 displays a diagram illustrating a typical correlation structure for detecting the presence of a pattern in a digital sample stream;

FIG. 7 displays a diagram illustrating a correlation structure for detecting the presence of a pattern in a digital sample stream using multiple correlations of a received data value according to a preferred embodiment of the present invention;

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 1:
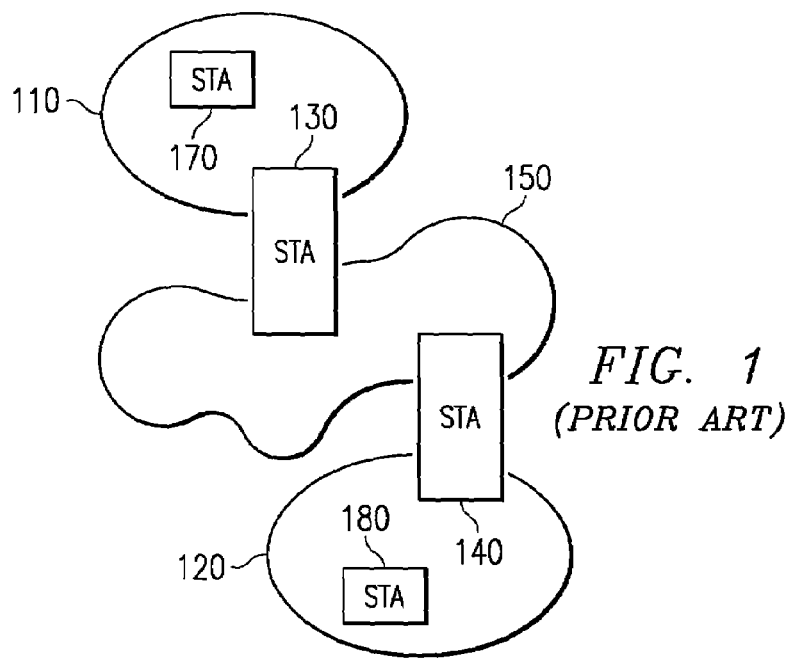
FIG. 1 displays a prior art diagram illustrating a typical configuration of a wireless communications network.

A preferred embodiment of the present invention discloses a method and apparatus for rapidly detecting the appearance of a boundary in a digital sample stream using multiple correlations of a received sample value with previously received sample values from the same digital sample stream. The boundary between different sequences of samples exists due to differences in periodicity, encoding, etc. between the sequences and there may or may not be any specific sequence of sample values to indicate the end of one sequence and the beginning of another. While the present implementation involves the use of the invention in detecting boundaries for a specific wireless communications system, namely the IEEE 802.11a wireless local area network, the ideas presented by the present invention have application in other types of networks, including wired networks. Therefore, the present invention should not be construed as being limited solely to the detection of patterns in a digital data stream for IEEE 802.11a wireless networks. Examples of other networks where the present invention may have applicability include Hiperlan networks Referring now to FIG. 1, a diagram (prior art) of a typical wireless local area network (LAN) installation according to the IEEE 802.11 technical standard, "ANSI/IEEE Std 802.11, 1999 Edition; Information technology—Telecommunications and information exchange between systems—Local and metropolitan area networks—Specific requirements. Part 11: Wireless LAN Medium Access Control (MAC) and Physical Layer (PHY) Specifications," which is incorporated herein by reference and a supplement to the IEEE 802.11 technical standard, "IEEE Std 802.11a-1999, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band," which is also incorporated herein by reference. FIG. 1 provides an illustration of the basic building blocks of an IEEE 802.11 network.

FIG. 1 displays a first basic service set (BSS) 110 and a second BSS 120. A BSS is the basic building block of an IEEE 802.11 network and can be thought of as a coverage area within which member stations may participate in direct communications. A BSS is started, formed, and maintained by an access point (AP). BSS 110 corresponds to AP 130 and BSS 120 corresponds to AP 140. An AP is a station that is connected to a distribution system (DS) 150. A DS allows multiple BSSs to interconnect with one another and form an extended service set. The medium used in a DS may be the same as the medium used in the BSSs or it may be different, e.g., the medium used in the BSSs may be wireless radio frequency (RF) while a DS may use fiber optic. Internal to BSS 110 is an AP 130 and a wireless station (STA) 170 while internal to BSS 120 is an AP 140 and a STA 180. A BSS may contain more than two stations (e.g., a maximum of about 20 stations per BSS is typical today), but it will have one AP.

As shown in FIG. 1, BSS 110 is connected to DS 150 via the access point 130 and the second access point 140 connects DS 150 to BSS 120. It should be noted that an access point also contains a wireless station and can be addressed like any other wireless station.

Stations within a BSS, for example, stations 130 and 170 in BSS 110, may communicate with one another without interfering with stations in other BSSs. However, the stations within a BSS cannot simply communicate whenever they wish; they must follow an established set of rules designed to minimize collisions and maximize performance.

Figure 2:
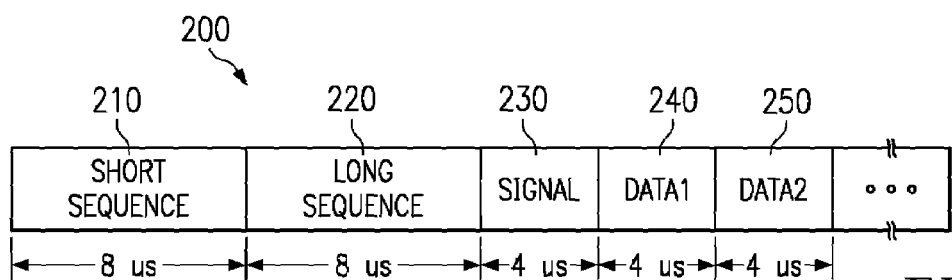
FIG. 2 displays a diagram illustrating a typical frame structure of an IEEE 802.11a wireless network communications packet.

Referring now to FIG. 2, a diagram illustrates the structure of a physical layer convergence protocol (PLCP) data unit (PLDU) 200 according to the IEEE 802.11a technical specifications. The data to be transmitted, depending on its overall size, may be broken up into multiple PLDUs, such as the PLDU 200, when transmitted. According to the IEEE 802.11a technical specifications, the PLDU 200 comprises an eight micro-second short sequence field 210 containing repetitions of a short sequence of samples, another eight micro-second long sequence field 220 containing repetitions of a long sequence of samples, a four micro-second signal field 230 containing information regarding the data payload, and a data payload that may be partitioned into multiple data fields (for example, data fields 240 and 250) depending on the amount of data being transmitted.

The short and the long sequences are specified in the IEEE 802.11a technical standards and their names refer to the relative lengths of their periods. The short sequence field 210 contains ten periods of the short sequence, while the long sequence field 220 contains two and a half periods of the long sequence. The purpose of transmitting the short sequence is to allow wireless stations in the wireless network to detect the beginning of the transmission. A secondary purpose of the short sequence is to permit the wireless stations to adjust the gain in their receivers to properly set the signal levels of the received signal for optimal receiver performance.

The long sequence is used by the receiver to train an adaptive channel equalizer. The purpose of the adaptive channel equalizer is to flatten the frequency response of the communications channel, e.g., amplify frequency ranges in the communication channel that are being attenuated and attenuate frequency ranges that are being amplified. The long sequence can also be used to adjust filter characteristics of digital filters present in the receiver. Since the long sequence is used to train the adaptive equalizer, it is preferred to not modify any portion of the long sequence. Modifications to the long sequence, through gain adjustments, would require additional processing when the long sequence is being used to train the adaptive equalizer. Since it is desirable to make gain adjustments throughout the short sequence, the earlier the long sequence is detected, the smaller the portion of the long sequence that may have received gain adjustments and hence requires gain compensation.

Figure 3:
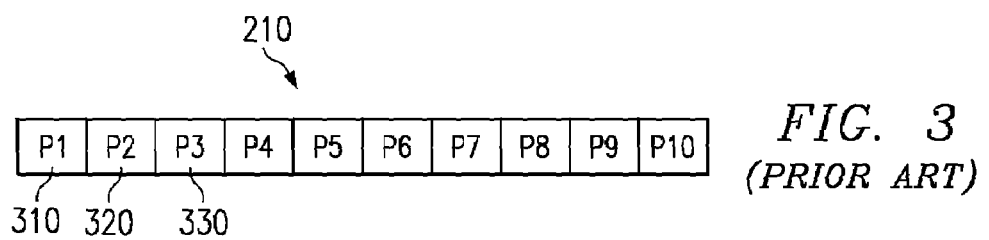
FIG. 3 displays a diagram illustrating a typical frame structure of a short sequence according to the IEEE 802.11a technical standard.

Referring now to FIG. 3, a diagram provides a view in greater detail of the short sequence field 210 according to the IEEE 802.11a technical specifications as it is transmitted. The short sequence field 210 is a field that is eight microseconds in duration (at the specified transmission rate) and contains 10 periods of the short sequence. FIG. 3 displays each of the 10 periods. Examples of the periods are shown as P1 310, P2 320, and P3 330.

Figure 4:
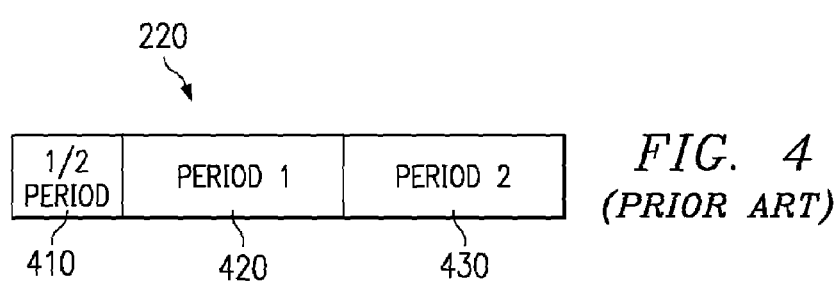
FIG. 4 displays a diagram illustrating a typical frame structure of a long sequence according to the IEEE 802.11a technical standard.

Referring now to FIG. 4, a diagram provides a view in greater detail of the long sequence field 220 according to the IEEE 802.11a technical standard as it is transmitted. The long sequence field 210 is a field that is eight micro-seconds in duration (at the specified transmission rate) and contains two periods of the long sequence (period 1 420 and period 2 430) plus an additional one-half period of the long sequence 410. The additional one-half period 410 is a 25 percent cyclic extension of the two periods in the long sequence field 220. The cyclic extension is present to help reduce the effects of intersymbol interference (ISI).

Referring to FIG. 5, a diagram illustrates the concatenation of the short sequence field and the long sequence field into what is commonly referred to as a PLCP preamble 500. A PLCP preamble is at the beginning of each PLDU. According to the IEEE 802.11a technical standard, the PLCP preamble 500 is used for automatic gain control (AGC) convergence, diversity (antenna) selection, timing acquisition, coarse and fine frequency acquisition, and channel (frequency response) estimation. The PLCP preamble 500 comprises the short and the long sequences. However, there is no special boundary or marker to indicate the end of the short sequence and the beginning of the long sequence. Therefore, designers of an IEEE 802.11a wireless network must devise a technique to determine the end of the short sequence and the beginning of the long sequence.

Correlation is a commonly used technique to detect the presence of a boundary in a digital sample stream. Basically, correlating two sequences involves comparing pairs of values, one from each sequence. If the values match, then the correlation value is incremented. If the values do not match, the correlation value is unchanged or decremented. After the correlation is complete, the correlation value is compared with a threshold value. If the correlation value exceeds the threshold, then the two sequences are deemed to be the same. Then a circuit configured per embodiments of the invention may out rut a value such as a one. If the correlation value does not exceed the threshold, then the two sequences are not the same. Then a circuit configured per embodiments of the invention may out rut a value such as a zero. Correlation is normally used to compare two sequences. However, with certain sequences that exhibit a specific set of characteristics, of which periodicity is one, correlation can be used to determine when one sequence with a certain set of characteristics ends and another sequence with a different set of characteristics begins.

In the case when the desired sequence is a periodic signal, correlation can be performed between the received signal currently being received and portions of the signal that were received previously. The correlation in this case will detect when the received signal no longer possesses the same characteristics as the previously received signal. Correlating a received signal with previously received signals has an additional advantage in that the received signal is being correlated with a reference signal that has transmitted through the same communications channel that it is being transmitted through. Therefore the reference signal would have likely undergone the same (or similar) fading, multi-path, interference that the received signal is undergoing. This will provide a better correlation than when comparing the received signal against a reference copy of the transmitted signal that is stored in memory.

Referring now to FIG. 6, a diagram illustrates a prior art correlation structure 600 for generating a correlation value for a received signal stream by correlating it with the same received signal that was previously received. The correlation structure 600 displayed in FIG. 6 compares a signal value that has been recently received with a previously received signal value that is one period earlier in the signal stream. In other words, if the signal being received is periodic, then the signal value is being correlated with an earlier copy of itself. If the signal is not periodic, then the signal is being correlated with essentially a random signal value.

FIG. 6 displays a sequence of six correlations, each shown as an inverted U-shaped line, originating from one period of a short sequence and ending at another. For example, a correlation 610 starts at a period 612 (labeled as P10) of the short sequence and ends at another period 614 (P9) of the short sequence. A correlation, as displayed in FIG. 6, symbolizes that a sample (or samples) in one period is being correlated with a sample (or samples) in a different period. Typically, if the sample being correlated with another sample matches, the correlation results in a one value and if the samples do not match, the correlation results in a zero value. After the multiple correlations are complete, their individual results are combined to produce an overall correlation value. For example, the result from the correlation 610 is presented to a summation block 620 via a connection 615. The summation block 620 combines the correlation result from correlation 610 and the correlation results from the other correlations and produces a correlation value. The description above is exemplary and can of course be generalized to the case where the correlation of two samples is the multiplication of one sample by the complex conjugate of the second and the output of the correlation structure is the sum of all such correlations.

Correlation, as displayed in FIG. 6, is a good way to detect boundaries between different sequences in a digital sample stream. However, by individually correlating pairs of sample values, the correlation displayed in FIG. 6 is slow to react to the arrival of a boundary. This is due to the fact that when a new sequence begins, sample values in that particular sequence are compared with the previous sequence in a single correlation. This means that remaining correlations in the correlation structure are correlating sample values from the previous sequence. Sample values from the previous sequence will stop contributing to the correlation earlier if the entire structure is shortened. Unfortunately, in this case, the strength of the correlation used for the detection of the initial sequence is sacrificed.

Referring now to FIG. 7, a diagram illustrates a correlation structure 700 for generating a correlation value for a signal sample value with previously received sample values according to a preferred embodiment of the present invention. FIG. 7 displays a correlation structure 700 that performs a correlation on the same type of samples as the correlation structure 600 displayed in FIG. 6. The correlation structure 600 displayed in FIG. 6 compared a sample (or samples) from a single period with a sample (or samples) in another period that is adjacent to the single period. The correlation structure 600 performs the same type of correlating a sample value from one period with a corresponding sample value in an adjacent period for each of the remaining correlations in the correlation structure 600.

Referring back to FIG. 7, the correlation structure 700 performs a correlation where a sample (or samples) from a single period is compared with a sample (or samples) in another period. However, all correlations in the correlation structure 700 use the sample (or samples) from the same single period in their correlations. For example, a correlation 710 compares a sample (or samples) from a period 712 with a sample (or samples) from a period 713. However, another correlation 711 compares a sample (or samples) from the period 712 with a sample (or samples) from a period 714. All of the correlations performed in the correlation structure 700 during a correlation calculation use a sample (or samples) from one period. The remaining correlations in the correlation structure 700 also compare a sample (or samples) from the period 712 with other samples from other periods.

According to a preferred embodiment of the present invention, each correlation is a single sample comparison of sample values from different periods. Alternatively, each correlation may compare a group of sample values from different periods. By comparing a group of sample values in a single correlation, a single multi-value correlation may replace a series of single-value correlations. According to another preferred embodiment of the present invention, the sample (or samples) being compared against other samples is among the most recently received samples.

According to yet another preferred embodiment of the present invention, the received sample values are stored in a memory that permits access to the received sample values in the order in which they were received, i.e., a first-in first-out memory structure. For example, if the most recently received sample value was stored in memory location zero, then memory location 64 would contain a sample value that was 64 sample values earlier in the sample stream. As another example, using this particular memory structure and assuming that the period of the short sequence was 16 sample values, a correlation structure comparing a single sample with six other samples corresponding to the sample value's position in the short sequence could be configured to compare the contents of memory locations zero, 16, 32, 48, 64, 80, and 96. In other words, the single sample is compared with samples at N periods away, where N is equal to 1, 2, 3 . . . 6. Other sets of memory locations are possible depending on the location of the sample to be compared, the periodicity of the short sequence in question, the number of correlations desired, etc. Derivation of different sets of memory locations is well understood by persons of ordinary skill in the art of the present invention.

The correlation structure 700 can be implemented out of a memory for storing the digital sample stream, a series of comparators with one per correlation being performed (if each correlation compares a single value with another single value), an adder for adding up the results of the individual correlations and producing the correlation value. The size of the memory depends on the number of correlations desired, with a larger memory required to support a larger number of correlations. The correlation structure 700 can also be implemented as a program executing in a processor. A software implementation will typically permit more flexibility in the number and types of correlations performed.

Figure 8:
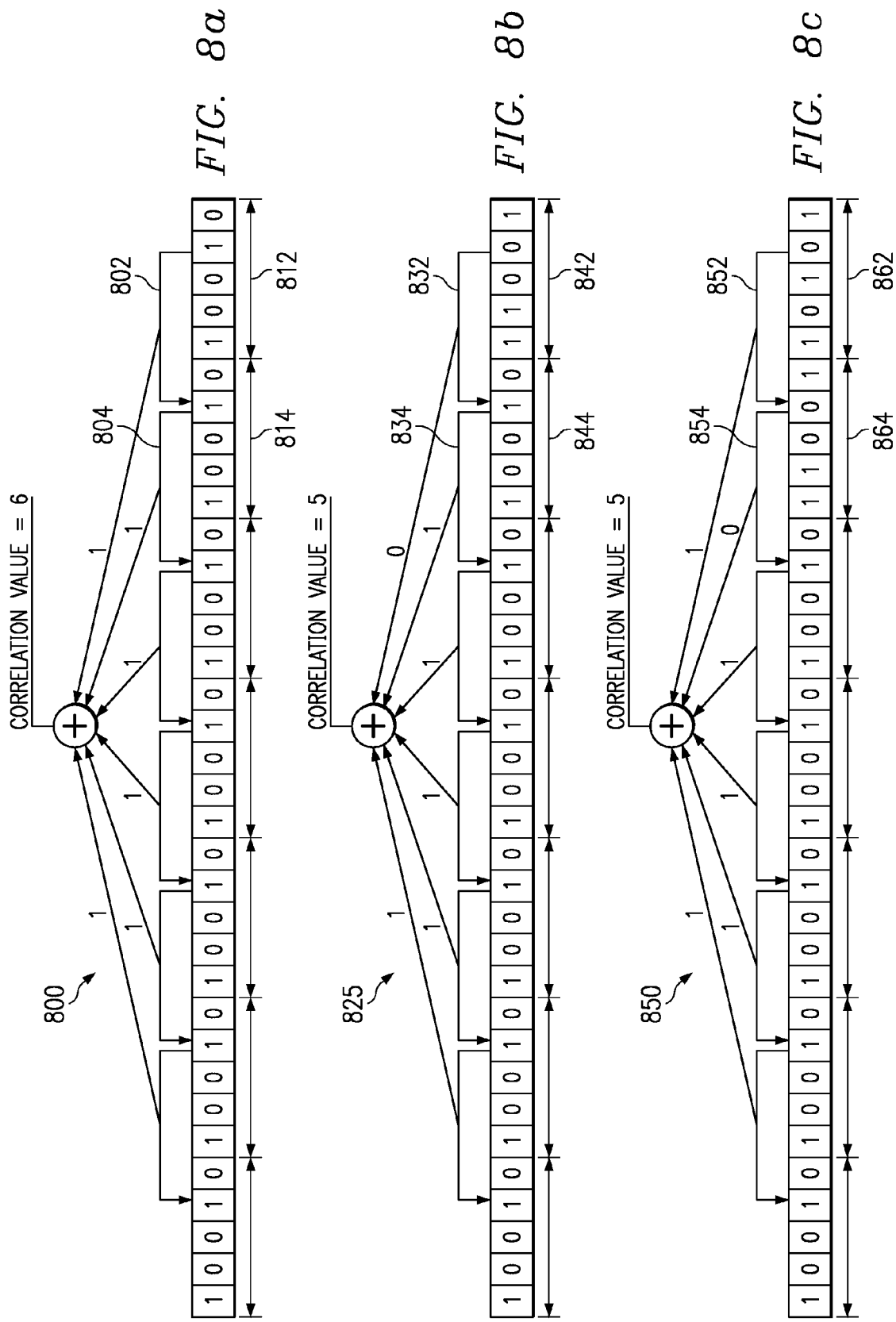
FIGS. 8a–c display an exemplary correlation using a typical correlation structure.

Referring now to FIGS. 8*a–c*, diagrams illustrate an example of the function of the correlation structure 600 displayed in FIG. 6. In the example displayed in FIGS. 8*a–c*, each period of the short sequence is a sequence of five sample values "1 0 0 1 0" and a sequence of the first few sample values of the long sequence are "1 1 0 0 1 1 0 1 0 1." FIG. 8*a* displays the correlation structure with the entire short sequence having been received. Each of the correlations compares the fourth sample value from each period with the fourth sample value from the period previously received. The correlation value (C.V.) is 6, since all six correlations compared values that matched.

FIG. 8*b* displays the correlation structure after the first five sample values of the long sequence has been received and stored in a set 842 of five memory locations. The final period of the short sequence is stored in a set 844 of five memory locations. The same correlations are calculated. However, the fourth sample value from the received portion of the long sequence does not match with the fourth sample value from the final period of the short sequence stored in set 844. However, the remaining correlations result in matches because the correlations are comparing various periods of the short sequence. The correlation value (C.V.) is 5.

FIG. 8*c* displays the correlation structure after the next five sample values of the long sequence has been received. The first five sample values of the long sequence are stored in a memory set 864 and the second five sample values of the long sequence are stored in another memory set 862. The remaining sets of memory store periods of the short sequence. A first correlation 852 compares the fourth sample value in memory set 862 with the fourth sample value in memory set 864, which happens to be a match. A second correlation 854 compares the fourth sample value in memory set 864 with the fourth sample value in the last period of the short sequence and the two sample values do not match. The remaining correlations match because the correlations are between different periods of the short sequence.

Figure 9:
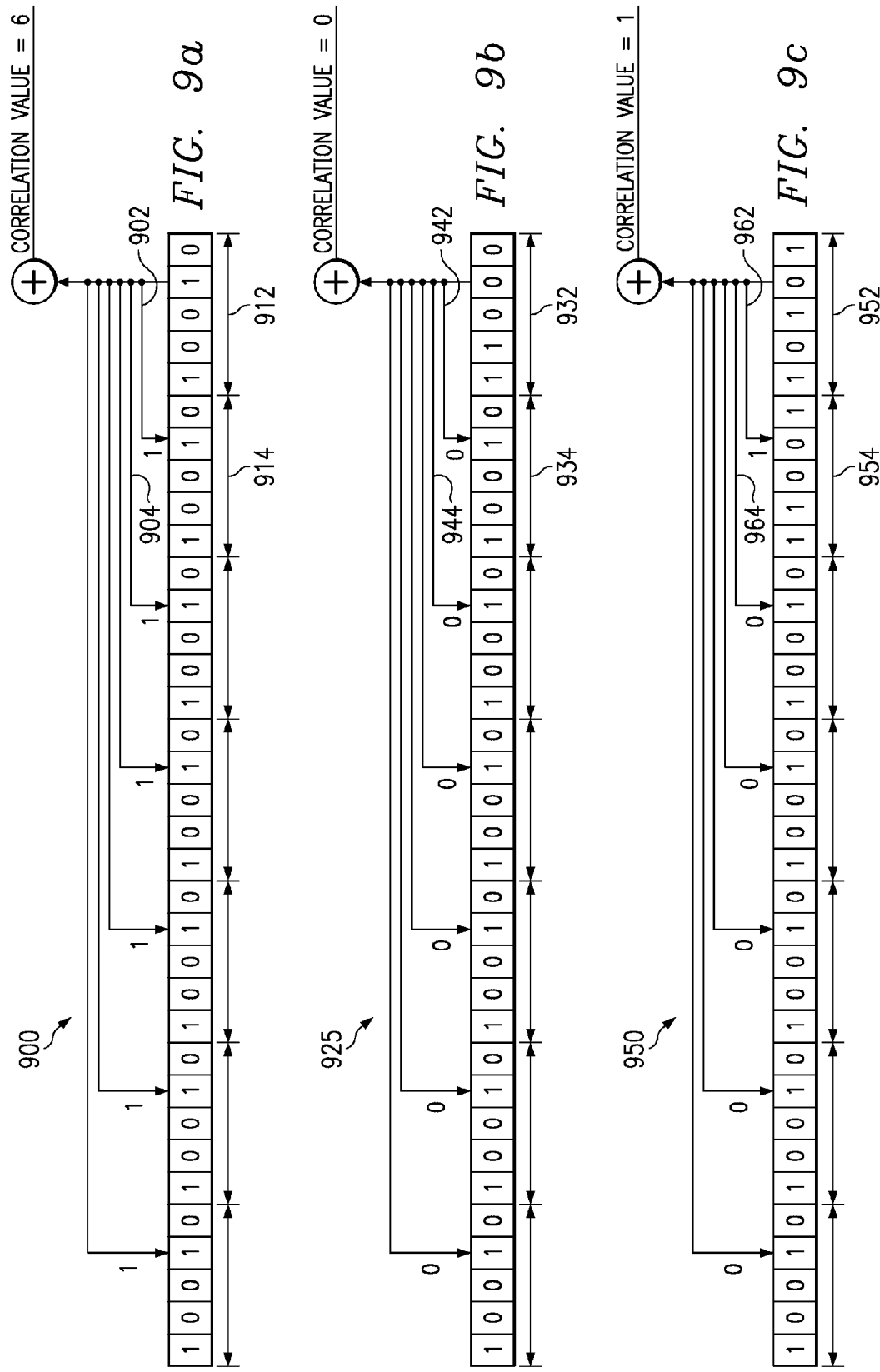
FIGS. 9a–c display an exemplary correlation using the correlation structure according to a preferred embodiment of the present invention.

Referring now to FIGS. 9*a–c*, diagrams illustrate an example of the function of the correlation structure 700 displayed in FIG. 7 according to a preferred embodiment of the present invention. The example displayed in FIGS. 9*a–c* will use the same sample sequences as used in the example displayed in FIGS. 8*a–c*. FIG. 9*a* displays the correlation structure with the entire short sequence having been received. Each of the correlations compares the fourth sample value from the most recently received period (stored in a memory set 912) with the fourth sample value from the previously received periods. The correlation value (C.V.) is 6, since all six correlations compared values that matched.

FIG. 9*b* displays the correlation structure after the first five sample values of the long sequence has been received and stored in a set 932 of five memory locations. The final period of the short sequence is stored in a set 934 of five memory locations. The same correlations are calculated as displayed in FIG. 9*a*. However, since the fourth sample of the first five samples of the long sequence is compared with the fourth samples from the various periods of the short sequence, none of the correlations match, resulting in a correlation value of zero. Compare this to the example displayed in FIG. 8*b*, where the correlation value was five. The reason for the large difference in the correlation values is because all but one of the correlations being performed in FIG. 8*b* are comparing sequences belonging to the short sequence, while the correlations being performed in FIG. 9*b* are comparing a part of the long sequence with the short sequence.

FIG. 9*c* displays the correlation structure after the next five sample values of the long sequence has been received. The first five sample values of the long sequence are stored in a memory set 954 and the second five sample values of the long sequence are stored in another memory set 952. The remaining sets of memory store periods of the short sequence. The correlations compare the fourth sample value from the second set of five sample values with the fourth value from the first set of five sample values from the long sequence (which happens to match) and the fourth value from the various periods of the short sequence (which do not match), resulting in correlation value of one.

Comparing the correlation structure 600 with the correlation structure 700 (and the underlying way in which they perform correlations), one can is easily note that after receiving a single sample from the long sequence, the correlation structure 700 can compare that single sample value with previously received sample value while the correlation structure 600 permits only a comparison of that single sample value with one previously received sample value. The correlation structure 600 retains history information about previously received sample values that must be shifted out of the structure before their effect on the correlation value can be removed. The correlation structure 600 requires that six, five-sample value sets of the long sequence (using the example data from FIGS. 8 and 9) be received before the effects of the short sequence correlations are no longer present in the correlation value. At the very least, four, five-sample value sets of the long sequence are needed before the effects of the short sequence can no longer dominate the determination of the correlation value.

The correlation structure 700 can detect the end of the short sequence and the beginning of the long sequence much earlier. After one or two, five-sample value sets of the long sequence are received, the correlation structure 700 can effectively detect the end of the short sequence and the beginning of the long sequence. The actual number of sets required would, in part, be determined by the threshold value specified in the receiver. As discussed previously, the early detection of the beginning of the long sequence is crucial since the long sequence is used mainly as a training sequence for the receiver's adaptive channel equalizer and should not be gain adjusted like the short sequence. The earlier the detection, the smaller the number of long sequence data values that were gain adjusted because they were thought to belong to the short sequence and that would require gain compensation.

According to a preferred embodiment of the present invention, the correlation structure 700 is programmable and can be configured to generate a correlation value as frequently as after the receipt of every sample value. Alternately, the correlation structure 700 can also be configured to generate a correlation value only after the receipt of a number of sample values that could, for example, be equal to the period of the short sequence.

Figure 10:
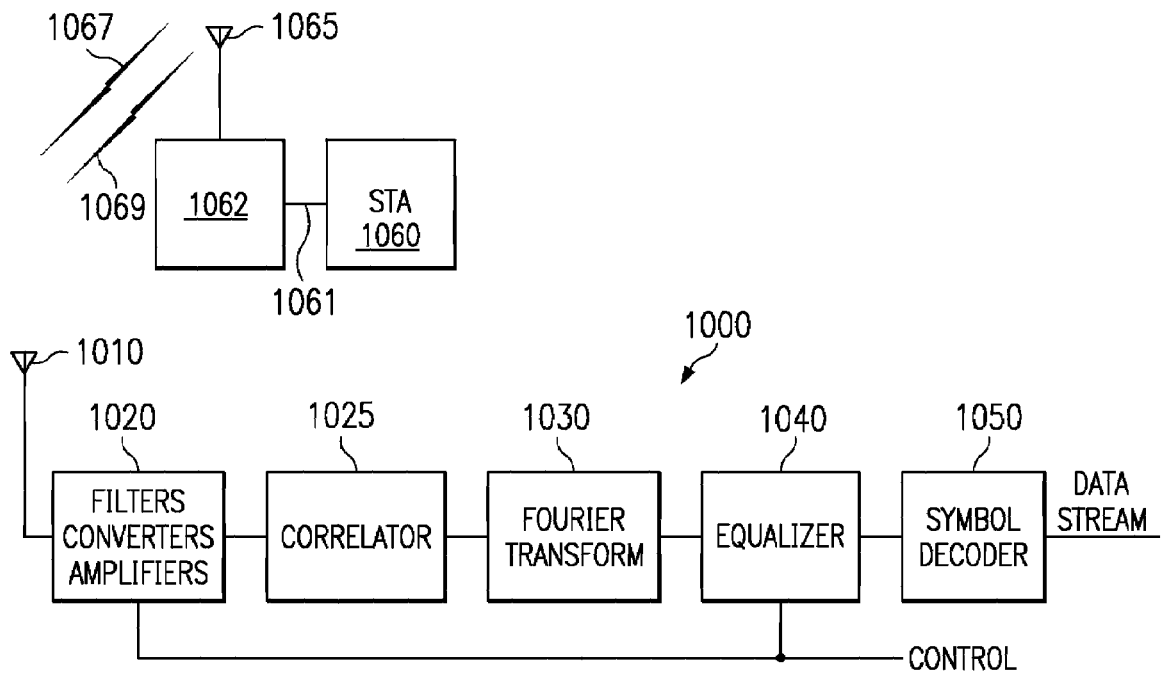
FIG. 10 displays a receive path of a wireless communications device according to a preferred embodiment of the present invention.

Referring now to FIG. 10, a block diagram illustrates a receive path 1000 of station in a wireless network according to a preferred embodiment of the present invention. Most stations in a wireless network can transmit information as well as receive it. This implies that the stations have a radio transmitter as well as a radio receiver. The present invention has application to the radio receiver portion of a station. Therefore, it is assumed that the station has a radio transmitter that is fairly typical of stations of a wireless network and will not receive any examination. The receive path 1000 displayed in FIG. 10 is for a station that is part of a wireless network using a multi-carrier modulation technique. As such, the receive path 1000 will contain hardware that is not present in a single-carrier system, however, since the present invention is to be used in the time domain, it is applicable to both single-carrier and multi-carrier systems.

An antenna 1010 receives the information that is transmitted over-the-air by wireless signals which may be single-carrier or multi-carrier 1067, 1069 from an antenna 1065 of a station 1060 which has its own transceiver 1062 coupled to it 1061. The antenna 1010 produces an analog signal stream that is directed to a filters-converters-amplifiers unit 1020. The filters-converters-amplifiers unit 1020 is an analog signal process unit that is responsible for filtering out undesired signals that lie outside of the frequency band of interest, amplifying the received signal to an appropriate signal level, and converting the analog signal stream into a digital data stream. Coupled to the filters-converters-amplifiers unit 1020 is a control line that can be used by a processor (not shown) to configure the unit 1020 to meet changing conditions of the communications channel.

After processing by the filters-converters-amplifiers unit 1020, the digital stream is sent to a correlator 1025. The correlator 1025 is used to compare the digital stream with certain reference data patterns or with itself. A function of the correlator 1025 is to detect the boundary between the short and the long sequences. This is required because not all of the information that a station receives is user data. Control data and configuration data are also transmitted over-the-air and in many communications systems, control data is transmitted along with user data, often in the same packet. The correlator 1050 compares values in the digital stream with other values in the digital stream (or with a reference data patterns saved in memory) to generate a correlation value. The correlation value is then used to determine if the correlator 1050 has been able to find the boundary.

After correlation, the digital stream is converted from its time domain representation into a frequency domain representation by a Fourier Transform unit 1030. The Fourier Transform unit 1030 converts the digital stream from its time domain representation into its frequency domain representation using one of many widely known Fourier Transform algorithms. This step is necessary for multi-carrier communications systems. In multi-carrier systems, the actually data encoding and decoding is performed in the frequency domain while the transmission (and reception of data is performed in the time domain).

After conversion into the frequency domain, the digital stream is fed to an adaptive channel equalizer 1040. The adaptive channel equalizer's function is to flatten the frequency response of the communications channel. It is well known that, on a wired connection, if the frequency band of interest is wide enough, portions of the transmitted signal that are in the upper portions of the frequency band will be attenuated more than the portions of the transmitted signal that are using the lower range of the frequency band. The adaptive channel equalizer 1040 provides additional gain to the upper frequency ranges to present a signal that has essentially the same gain across the entire frequency band of interest. Similarly, on a wireless connection, the effect of multi-path distortion is to create frequency selective fading across the band occupied by the signal. After this distortion some frequencies will be more attenuated than others. The adaptive channel equalizer 1040 provides additional gain to the carriers that are more attenuated to present a signal that has essentially the same gain across the entire frequency band of interest. The adaptive channel equalizer 1040 is controlled by a processor (not shown), which provides it with the necessary configuration information to flatten the frequency response of the communications channel. The adaptive channel equalizer 1040 may be coupled to the same control line that is coupled to the filters-converter-samplifiers unit 1020. The control line is used to provide the necessary configuration information to the adaptive channel equalizer 1040.

Finally, a symbol decoder 1050 takes the equalized frequency domain data and produces a data stream that is suitable for processing by components further down the receive path 1000. The data stream may be provided to processor (not shown) for any further processing or a digital device (not shown) where it is put to use.

The Fourier Transform unit 1030, the symbol decoder 1050, and the correlator 1025 are displayed in FIG. 10 as being distinct units, but they can in fact be functional units in a processor (not shown) in the station. According to a preferred embodiment of the present invention, these functional units and others that are not shown are actually programs executing in executable memory of the processor. According to another preferred embodiment of the present invention, the functional units are implemented as custom designed hardware blocks inside the processor.

Figure 11:
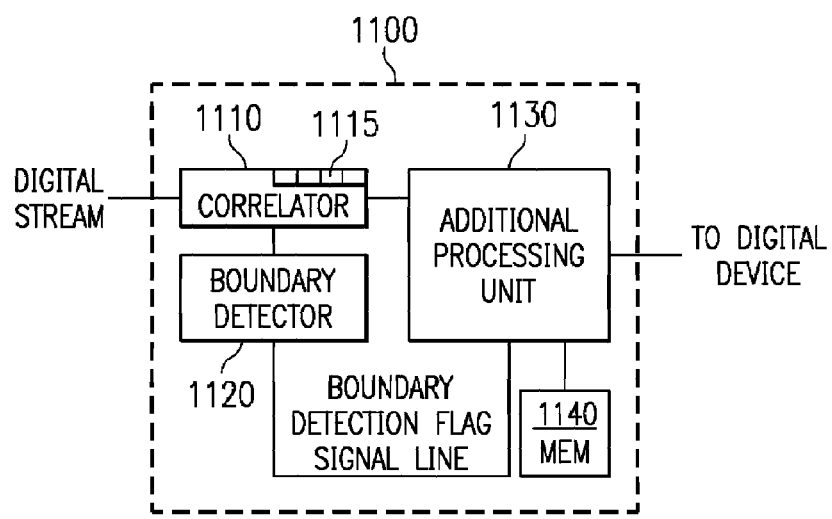
FIG. 11 displays a detailed view of a processor of a wireless communications device according to a preferred embodiment of the present invention.

Referring now to FIG. 11, a diagram illustrates a detailed view of a processor 1100 for a station in a wireless network according to a preferred embodiment of the present invention. As discussed previously, the various functional blocks of the receiver 1000 may actually be implemented as programs executing in a processor in the station. FIG. 11 displays a processor 1100 containing a correlator 1110 having a plurality of comparators 1115, a boundary detector 1120, a memory 1140, and an additional processing unit 1130. The correlator 1110 receives its input from a symbol decoder, which may in fact, be a part of the processor 1100. The dashed line on the left side of the processor 1100 is to represent a boundary to the processor 1100 that may or may not exclude the symbol encoder and other functional blocks. The actual boundary of the processor 1100 is not important to the operation of the present invention. Similarly, the memory 1140 is shown in the processor 1100 and the plurality of comparators shown within correlator 1110. The comparators do have to be coupled to the memory the actual location of these components is not important to the operation of the invention. A summing circuit coupled to the plurality of comparators, the summing circuit containing circuitry to add the outputs from the plurality of comparators and produce a correlation value may be located in the additional processing unit 1130. FIGS. 6–9 are illustrative of the operation of the summing circuit.

The correlator 1110 receives a digital stream from a filters-converter-samplifiers unit and based on its programming, attempts to correlate the data stream with reference patterns or with itself to detect boundaries that are present in the data stream. The correlator 1110 provides the result of the correlation to a boundary detector 1120. The boundary detector 1120 is used to determine if a boundary has indeed been found. The boundary detector 1120 may base its determination on a simple threshold. If the correlation value produced by the correlator 1110 crosses the threshold, the boundary detector 1120 will determine that the boundary has been detected. Alternatively, the decision may be a more complex decision that is based in part on the quality of the signal being received. If the signal quality is poor, then the boundary detector may change its threshold to reduce the probability of erroneously detecting a boundary that is not there.

Once the boundary detector decides that the correlator 1110 has detected a boundary, it asserts a boundary detection flag signal line. The boundary detection flag signal line is coupled to an additional processing unit 1130. The additional processing unit may contain any further processing that may be performed by the processor 1100. Upon detection of the assertion of the boundary detection flag signal line by the additional processing unit 1130, the boundary may then be marked. By marking the boundary, it becomes easier for units further down the process to obtain access to the parts of the data stream that they need.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit for detecting boundaries in a stream of digital samples, the circuit comprising:
   a memory for storing at least a portion of the stream of digital samples wherein each digital sample comprises a plurality of values;
   a plurality of comparators coupled to the memory, a first input of each comparator coupled to a first memory location storing a first digital sample and a second input of each comparator coupled to different memory locations wherein the different memory locations correspond to digital samples received prior to the first digital sample and at least one value of the first digital sample stored in the first memory location is compared with a corresponding value of each one of the digital samples stored in the different memory locations, each comparator is configured to output a one value if the comparison is equal and a zero value if the comparison is not equal; and
   a summing circuit coupled to the plurality of comparators, the summing circuit containing circuitry to add the outputs from the plurality of comparators and produce a correlation value.

2. The circuit of claim 1, wherein the circuit is configured to generate a correlation value after the receipt of a specified number of digital samples.

3. A communication device comprising:
   a receive path containing circuitry to receive and convert information sent to the device into a form suitable for use; and
   a processor coupled to the receive path, the processor containing circuitry to detect boundaries in a stream of digital samples, the processor comprising:
   a memory for storing at least a portion of the stream of digital sample values;
   a plurality of comparators coupled to the memory, a first input of each comparator coupled to a first memory location storing a first digital sample and a second input of each comparator coupled to different memory locations wherein the different memory locations correspond to digital samples received prior to the first digital sample and at least one value of the first digital sample stored in the first memory location is compared with a corresponding value of each one of the digital samples stored in the different memory locations, each comparator is configured to output a one value if the comparison is equal and a zero value if the comparison is not equal; and
   a summing circuit coupled to the plurality of comparators, the summing circuit containing circuitry to add the outputs from the plurality of comparators and produce a correlation value.

* * * * *